No. 622,793. Patented Apr. 11, 1899.
G. A. BROCKHURST.
SIDEHILL HARROW DRAFT ATTACHMENT.
(Application filed Nov. 14, 1898.)
(No Model.)

Witnesses, Inventor,
George A. Brockhurst
By Dewey Strong & Co.
Attys

UNITED STATES PATENT OFFICE.

GEORGE A. BROCKHURST, OF ORINDA PARK, CALIFORNIA.

SIDEHILL-HARROW DRAFT ATTACHMENT.

SPECIFICATION forming part of Letters Patent No. 622,793, dated April 11, 1899.

Application filed November 14, 1898. Serial No. 696,326. (No model.)

*To all whom it may concern:*

Be it known that I, GEORGE A. BROCKHURST, a citizen of the United States, residing at Orinda Park, county of Contra Costa, State of California, have invented an Improvement in Sidehill-Harrow Draft Attachments; and I hereby declare the following to be a full, clear, and exact description of the same.

My invention relates to a draft attachment for harrows, which is especially designed for harrows which are used in cultivating land upon sidehills or in other sloping positions where the harrow is drawn over the land at right angles with the line of the slope.

It consists, essentially, of a bar interposed between the harrow and the team and a traveler movable upon said bar and clamps or stops adjustable with relation thereto to regulate and determine the movement of the traveler upon the connecting-bar.

The object of my invention is to so connect the harrow with the team by which it is drawn as to keep the harrow moving essentially in the line of travel of the team and prevent its sliding down the hill by the action of gravitation.

The device is applicable for the single or double harrows.

Figure 2:
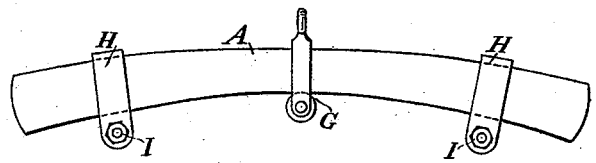

In the accompanying drawings, Figure is a plan showing the application of my device. Fig. 2 is a plan of the device.

When harrows are hauled transversely along over inclined land or sidehills, the tendency of the harrow is to continually slide down below the line of draft and travel, and this I counteract by the use of my device, which consists of a slightly-curved bar or bars A, connected by chains or other attachments B with the front end of the harrow C.

In some cases a single harrow is employed, in which case one of the bars A will be used.

Figure 1:
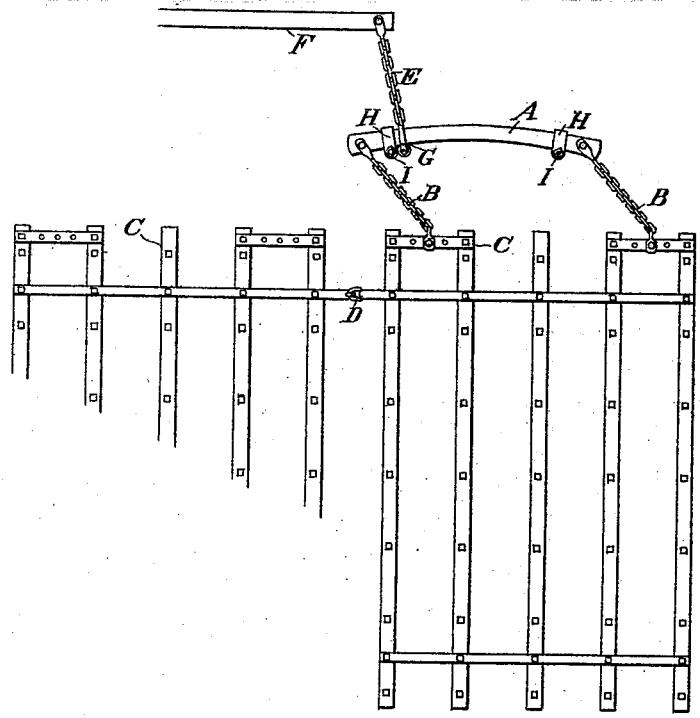

If two harrows are employed, they are linked together, as shown in Fig. 1, in the usual manner at D, and two of the bars A are employed, each being connected with the front of one of the harrows by the chains B.

Connection is made with the single or double tree F by chains E, having rings G upon the ends, which are slidable upon the curved bars A.

Upon the bar or bars A are fixed the slidable clamps H, which may be made and connected in any suitable or desired manner. In the present case I have shown them as clasping the bar A and being secured by clamping nuts and bolts, as at I; but any equivalent means for easily adjusting the clamps may be employed. These clamps being adjusted to suit the inclination of the hill and the tendency of the harrow to slide downward, which can be ascertained by a trial, the team is driven, for instance, so that if the team is moving in the direction of the arrow the rings G will be pulled over, so as to come in contact with the left-hand stops H, these stops being on the uphill side of the harrow. This draws the harrow in a diagonal position over the ground with the lower front corner in advance of the upper front corner, and in this position the harrow will maintain its line of travel with great accuracy. When the end of the field is reached, the horses are turned toward the downhill side, the rings G slipping over to the right-hand stops H, and when the harrow is turned around it will be in the same relative position to the hill, with the exception that the draft will now be against the opposite stops H, which are now on the uphill side for the return of the harrow. In this manner the draft is shifted alternately from one side to the other, and the harrow always travels in the same relative position in both directions upon the hillside.

Having thus described my invention, what I claim as new, and desire to secure by Letters Patent, is—

The combination with a harrow, of a curved bar flexibly connected with the front, a ring slidable upon said bar and connecting directly with the draft attachment, stops adjustably fixed upon the bar and including clamps embracing said bar and having nuts and bolts for fixing them in place, said stops movable on the bar so as to determine the amount of travel of the ring thereon substantially as described.

In witness whereof I have hereunto set my hand.

GEORGE A. BROCKHURST.

Witnesses:
S. H. NOURSE,
JESSIE C. BRODIE.